United States Patent [19]

Korner et al.

[11] 4,175,798

[45] Nov. 27, 1979

[54] ENDLESS TREAD OF THE SINGLE-PIN TYPE

[75] Inventors: Otto Körner, Wermelskirchen; Christian Bardiani, Wuppertal, both of Fed. Rep. of Germany

[73] Assignee: Diehl GmbH & Co., Nüremburg, Fed. Rep. of Germany

[21] Appl. No.: 894,116

[22] Filed: Apr. 6, 1978

[30] Foreign Application Priority Data

Dec. 13, 1977 [DE] Fed. Rep. of Germany ....... 2755412

[51] Int. Cl.² ............................................. B62D 55/20
[52] U.S. Cl. .................................................. 305/58 R
[58] Field of Search .................. 305/58 R, 58 PC, 42, 305/36, 35, 59

[56] References Cited

U.S. PATENT DOCUMENTS

| 2,396,848 | 3/1946 | Haushalter | 305/42 X |
|---|---|---|---|
| 2,430,573 | 11/1947 | Krotz | 305/42 |
| 2,563,848 | 8/1951 | Knox | 305/54 |

*Primary Examiner*—John P. Shannon
*Attorney, Agent, or Firm*—Scully, Scott, Murphy & Presser

[57] ABSTRACT

An endless tread of the single-pin type which includes a rubber-supported bolt in a tread member and cog-like connecting locations fastening the bolt to the tread member. The bolt incorporates rubber rings vulcanized thereon, and is pressable into a transverse bore in the tread member. Clamping lugs are slidable onto the bolt and clamping the latter to form a detachable connection to an adjoining tread member.

10 Claims, 6 Drawing Figures

ENDLESS TREAD OF THE SINGLE-PIN TYPE

The present invention relates to an endless tread of the single-pin type having a rubber-supported bolt in a tread member.

An endless tread is presently known (U.S. Pat. No. 2,563,848) wherein, for the purpose of receiving support shafts, a track shoe includes two aligned bores on one side thereof and, on the other side, includes three hook portions. Two support shafts are rotatably arranged within the bores through the intermediary of bearings. These support shafts incorporate rectangular sections at their ends which engage in corresponding rectangular channels in the hook portions of an adjoining track shoe element. A grouser, which is substantially mushroom-shaped in cross-section, closely engages into these channels. Apertures are provided in the hook portions as well as in the rectangular shaft sections and, in alignment therewith, threaded apertures in the grouser. Cap screws which are introduced into the apertures fixedly clamp the support shafts in the hook portions. For high-powered vehicles, in particular armored vehicles, such extremely high tensile stresses can occur within the endless track, such that the hook portions will rupture through a notching or stress concentration effect.

Further known is an endless tread with single-piece grouser plates (U.S. Pat. No. 2,686,697). A rubber-supported hexagonal bolt supported in a tread or grouser plate attachment is located in correspondingly shaped apertures between the grouser plates. A screw which is inserted in the grouser plates fastens them to the bolts, the latter of which are provided with a corresponding aperture, in a closely fitted and secured relationship. In that instance, the grouser plates are already subjected to a shearing action. Added thereto are the dynamic loads encountered during vehicle operation, which are introduced through the bolts to the screws and the grouser plates in the tread.

Deformed grouser plates formed by foreign or external influences (road obstructions) acting in the tensile direction of the grouser plates, can render difficult a separation of the endless tread, for example, in the replacement of damaged treads. Deformed grouser plates clamp the screws, as well as the bolt.

For high-powered treaded vehicles, in particular armored vehicles, there is required an endless tread with the lowest possible weight and a particularly long useful life. This leads to reduced tread cross-sections, also in the region of the previously mentioned joint locations. In this case, disadvantageous is the notching or stress concentration effect of the profiled aperture in the tread. Although this can be eliminated through the provision of suitable rounding off in the aperture, nevertheless the grouser plates are always still in danger of cracking or fissuring. Here, there must also be considered the different stress relationships produced in the tread during manufacture (casting process).

Accordingly, an object of the present invention is to contemplate the provision of a fracture-resistant endless tread for high loads and at a low manufacturing cost, which is easily assembled and disassembled.

The components, such as clamping lugs and bolts, which are especially exposed to wear and tear through bending and stretching, are exchangeable so that there can be achieved a lengthy service life expectancy for the endless tread. The treads themselves are long-lived.

The joint or connecting locations which are constructed allow for a load transfer with a large cross-section from the tread to the fastening cog without notching or stress concentration effects on the tread when constructed in a manner characterized in that in the travel direction, the tread includes at least two cogs on one side of the tread member and, on the other side, in the region of a bolt includes free recesses for the assembly and fastening of clamping lugs, which are form-fittingly and nonrotatably but releasably fastened to the cog and bolt. The cog is simply manufactured by a casting process and producible without critical stress regions. The grouser plate is also producible in a simple manner as a specialized fastening element from a suitable high tensile and stress concentration-resistant material, and can be optimized with regard to its cross-section. Also during vehicle operation, the joint or connecting location is free from disturbance since in the connecting location, or respectively intermediate connecting location, eventually penetrating foreign bodies entering from sideways or below will not exert any spreading effect. Viewed in the direction of vehicle travel, the connecting location is closed. In contrast therewith, in the subject matter of the abovementioned U.S. Pat. No. 2,686,697, hard foreign particles impressed between the grouser plates can produce an additional load which may lead to the fracture of the grouser plates and, resultingly, the endless tread. The inventive connecting locations, due to the compact cogs, facilitate a tread which is simply manufactured. Furthermore, U.S. Pat. No. 2,686,697 provides no teaching with regard to the inventive object since it does not provide information as to the connection of tread members through the intermediary of an additional connecting element (grouser plate). However, this additional connecting element facilitates eliminating of manufacturing problems for the tread member, so that the most heavily loaded connecting element (grouser plate) can be optimally designed with regard to the stresses, and the susceptibility to trouble during vehicle operation is considerably reduced.

Embodiments of the invention characterized in that the cog includes clamping surfaces extending parallel to the travel plane of the tread member and corresponding with the inner surfaces of the clamping lugs facilitate a simple mounting of the grouser plate on the support cog through sliding on, or respectively disassembly, by means of resilient spreading of the grouser plate without any residual effects.

An inexpensive and safe type of connection of the grouser plate on the tread member is achieved in embodiments characterized in that the cog and the clamping jaws of the clamping lug include bores extending transverse to a traveling plane receiving a threaded connector.

Surprisingly in an intermediate bracket or clamp, the bolt cross-section in the region of the intermediate clamp is not only maintained but is also reinforced, and wherein the bolt is fixedly clamped through the intermediate clamp by means of a collar and, respectively, sleeves constituting a spring clamping sleeve or mating sleeve slidable onto the bolt. Hereby, the bolt ends are unloaded to some extent and, above all, no wear will occur so that the carrying surfaces remain equal over the entire operating period.

Embodiments characterized in that the bolts include at the ends thereof, and conversely the associated clamping lugs, include an arcuate portion and a flat surface secured against rotation provide security against rotation between the end clamp and the bolt.

Embodiments characterized by a projection extending the arcuate portion on the clamping lugs reduce the specific surface load through an increased encompassing of the end clamp.

Exemplary embodiments of the invention are illustrated in the drawing.

Illustrated is the following:

Figure 1:
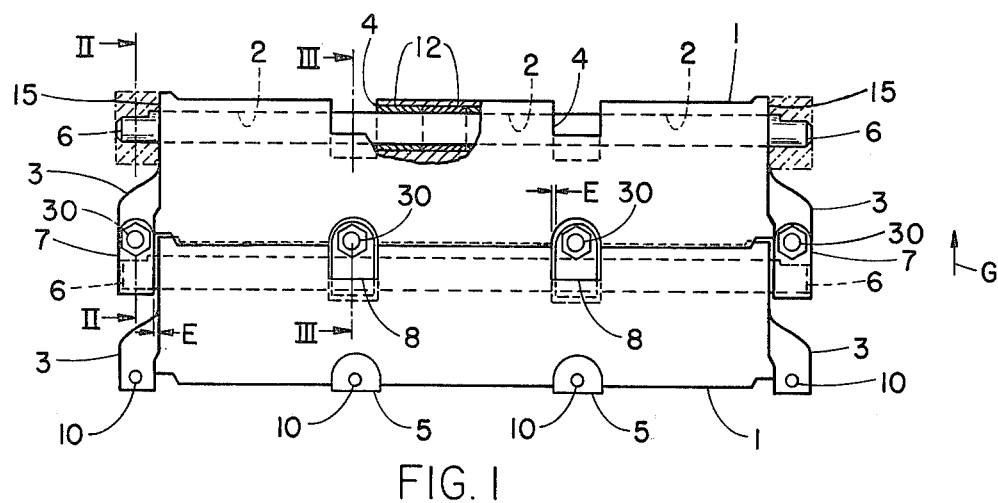
FIG. 1 is a section of an endless tread for high-powered treaded vehicles.

The illustrated tread members 1, 31 and 32 are shown in a simplified manner. These tread members are produced as castings from a correspondingly suitable material. As may be ascertained from FIGS. 2 and 3, the tread members, in a known manner, include guide teeth, gripping cleats and tread pads. These developments are not inventive and are thereby not designated with reference numerals.

Figure 2:
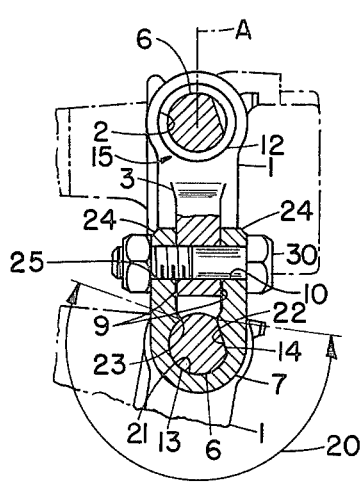
FIG. 2 is a section through FIG. 1.
Figure 3:
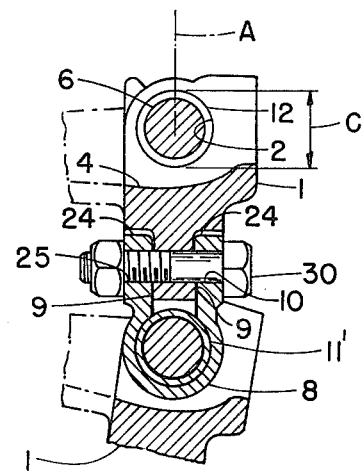
FIG. 3 is a section through FIG. 1.

The tread section illustrated in FIGS. 1 through 3 for a heavy and high-powered treaded vehicle consists of the tread members 1 including:

sidewise arranged, mutually aligned bores 2 and end cogs 3 traversing into the tread members 1, free interspaces 15, recesses 4 provided at the end face (corresponding to the free interspaces 15) and intermediate clamps 5, support bolts or shafts 6 pressed into the bores 2, end lugs 7 and intermediate lugs 8 formed as clamping lugs.

The cogs 3 and 5 possess mutually parallel surfaces 9 which are located in the traveling plane A and a bore 10 arranged transversely thereto.

Figure 4:
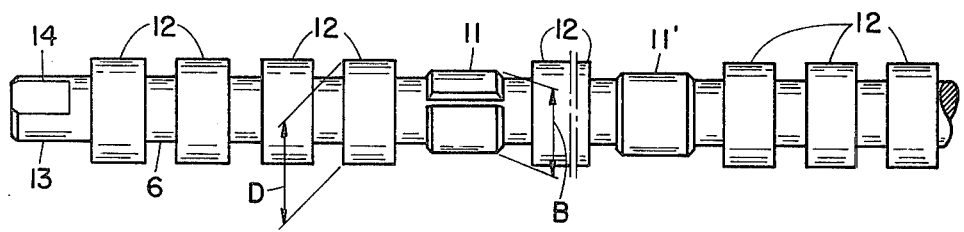
FIG. 4 is a support bolt according to FIGS. 1 through 3.

The bolts or shafts 6 are constructed in conformance with FIG. 4. As shown clearly therein, the bolt or shaft 6 has a constant cross section along its length, with the exception of the flat surfaces 14 provided on the ends thereof. A spring clamping sleeve 11 and, for example, an unslit sleeve 11' is slid onto the bolt 6 and, thereafter, rubber rings 12 are vulcanized thereon. The diameter B of the spring clamping sleeves 11 is somewhat smaller than the diameter C of the bore 2. In contrast therewith, the diameters of the sleeves 11 and 11' are so dimensioned with respect to the diameter of the intermediate cog so as to be slidable thereon for assembly purposes.

The diameter D of the rubber rings 12, in a known manner, is larger than the diameter C of the bore 2.

Provided on the ends of the shaft 6 in addition to the curved surface 13 is a flat surface 14.

The end clamping lug 7 according to FIG. 2, in its encompassing region 20 is provided with curvature 21 and flat surface 22 corresponding to the cross-section of the described ends of the bolt 6 in order to restrain the bolt 6 from rotation. The curved portion 21 is extended by a projection 23. Furthermore, the end clamping lug 7, as well as the intermediate clamping lug 8 possesses clamping jaws 24 having an aperture 25.

The intermediate clamping lug 8 according to FIG. 3 in an arcuate manner encircles the spring clamping sleeve 11.

The tread section pursuant to FIGS. 1 through 3 is assembled in the following manner:

By means of an arrangement not illustrated herein, the tread members 1 which are to be interconnected and the intermediate clamping lug 8 are fixed in the recesses 4 with sidewise play E (FIG. 1).

The bolt 6 is pressed into the bores 2 and thereby traverses with the spring clamping sleeves 11 and, respectively, sleeve 11' through the intermediate clamping lug 8. The rubber rings 12 are hereby compressed and almost completely fill the bores 2 (FIG. 1).

The intermediate clamping lugs 8 are so oriented on the spring clamping sleeves 11, or alternatively 11', as required through sideways displacement, so that the bores 10 come into alignment. Through threaded connectors 30 the intermediate clamping lugs 8 are fastened on the intermediate cogs 5 in a form-fitting and secure manner. In that instance, the spring clamping sleeve 11, or alternatively 11', is also fastened on the bolt 6 secured against rotation through elastic deformation.

The end clamping lugs 7 are slid onto the ends of the bolt 6 and the end cogs 3, and are fastened to the tread member 1 by means of threaded connectors 30 with sideways play E (FIG. 1).

Assembled in the abovedescribed manner are also the remaining tread sections.

According to FIG. 1 there is illustrated a bolt 6 without sleeves 11, respectively 11', and intermediate sections, which is pressed into the tread member 1. This results due to the somewhat clearer representation of the recesses 4. For a complete section of a tread assembly all of the mentioned components must be present.

When two adjoining tread members 1 are pivoted about the bolt 6 then, in a known manner, the deformed rubber rings form the swivel bearing. A fracture of the clamping lugs 7 and 8 caused by foreign or external influences, or a loosening of the bolt within the clamping lugs, is precluded due to the two-sided lug positioning on the clamps and bolts and is due to the prestressing of the clamps in the assembled condition. The threaded connectors are secured against loosening in a known but not herein illustrated manner. Collective components which are essential for the connections, such as screws and seating surfaces of the bores and the bolts are protected against foreign or external influence. Thereby, the tread members are at all times exchangeable without assembling difficulties, or the endless tread may merely be separable.

Figure 5:
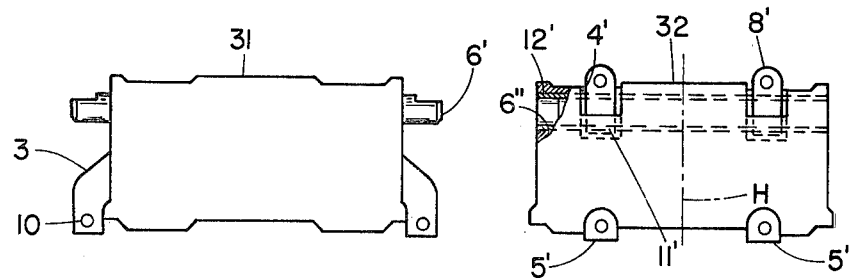
FIGS. 5 and 6 are, respectively, tread members for lightweight treaded vehicles.
Figure 6:
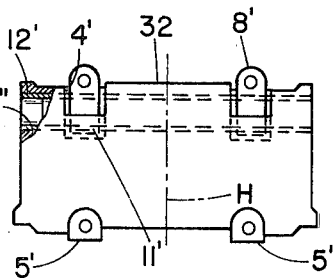

For lightweight treaded vehicles, an endless tread may be constituted from a tread member 31 or 32, as may be ascertained from FIGS. 5 and 6. In principle, the tread member 31 according to FIG. 5 corresponds to the tread member 1. It distinguishes from the former essentially through the absence of recesses 4 which would be provided for the intermediate clamping lugs 8. Correspondingly lacking on the bolt 6' are the sleeves 11, 11'. However, the rubber rings 12 are still present. Serving for the connection of tread members 31 are the end clamping lugs 7 as illustrated in FIG. 2.

The drive for these treads in the travel direction G is effected through the intermediary of sprocket gear wheels or bogies of a vehicle which engage into specialized portions of the individual tread members, not illustrated herein.

The tread member 32 pursuant to FIG. 6 possesses, similar to the tread members 1 according to FIG. 1, a rubber-supported bolt 6" with rubber rings 12' and sleeves 11'.

Also the recesses 4' with inserted intermediate clamping lugs 8' correspond, in principle, with the characteristics described in connection with FIGS. 1, 3 and 4.

The tread members according to FIGS. 5 and 6 are exemplary embodiments which utilize the inventive concept. In addition to these examples, it is also possible to provide, for snow vehicles, in the center (see FIG. 6, reference designation H) of a tread member only a single recess 4' for an intermediate clamping lug 8' and, correspondingly, only one intermediate cog 5'.

What is claimed is:

1. Endless tread pursuant to the single-pin type including a rubber-supported bolt in a tread member, and connecting components in the form of a clamp connection for nonrotative fastening of said bolt to said tread member, characterized through the combination of:
   a bolt being provided with rubber rings vulcanized thereon and being pressable into a transverse bore in said tread member;
   clamping lugs being slidable onto said bolt and clamping the latter to form a detachable connection with an adjoining tread member; and
   said tread includes, in the travel direction, at least two cogs on one side of said tread member and, on the other side, in the region of said bolt includes free recesses for the assembly and fastening of said clamping lugs, and said clamping lugs being form-fittingly but releasably fastened to said cogs and said bolt.

2. Endless tread as claimed in claim 1, characterized in that said bolt has a continuous constant cross-section intermediate its ends.

3. Endless tread as claimed in claim 1, characterized in that said bolt has flats at the ends thereof, and a continuous constant cross-section extending to said ends.

4. Endless tread as claimed in claim 1, characterized in that each clamping lug includes an arcuate portion encompassing said bolt and receives a cog on said tread member intermediate clamping jaws provided on said clamping lug.

5. Endless tread as claimed in claim 1, characterized in that each cog includes clamping surfaces extending parallel to the travel plane of said tread member and corresponding with the inner surfaces of a clamping lug.

6. Endless tread as claimed in claim 1, characterized in that said cog and the clamping jaws of said clamping lug include bores extending transverse to the traveling plane for receiving a threaded connector.

7. Endless tread as claimed in claim 1, characterized in that said tread member includes at least one intermediate cog having surfaces in the traveling plane of said tread member; an intermediate clamp encompassing said bolt, said bolt having a sleeve, said clamp being slidable onto said cog in the travel direction and being fastened by a screw connection.

8. Endless tread as claimed in claim 7, said sleeve constituting a spring clamping sleeve slidable onto said bolt.

9. Endless tread as claimed in claim 1, characterized in that said bolts include at the ends thereof an arcuate portion and a flat surface, and each associated clamping lug includes an arcuate portion and a flat surface to secure an associated bolt and clamping lug against rotation.

10. Endless tread as claimed in claim 9, characterized in that a projection extends the arcuate portion on said clamping lugs.

* * * * *